UNITED STATES PATENT OFFICE.

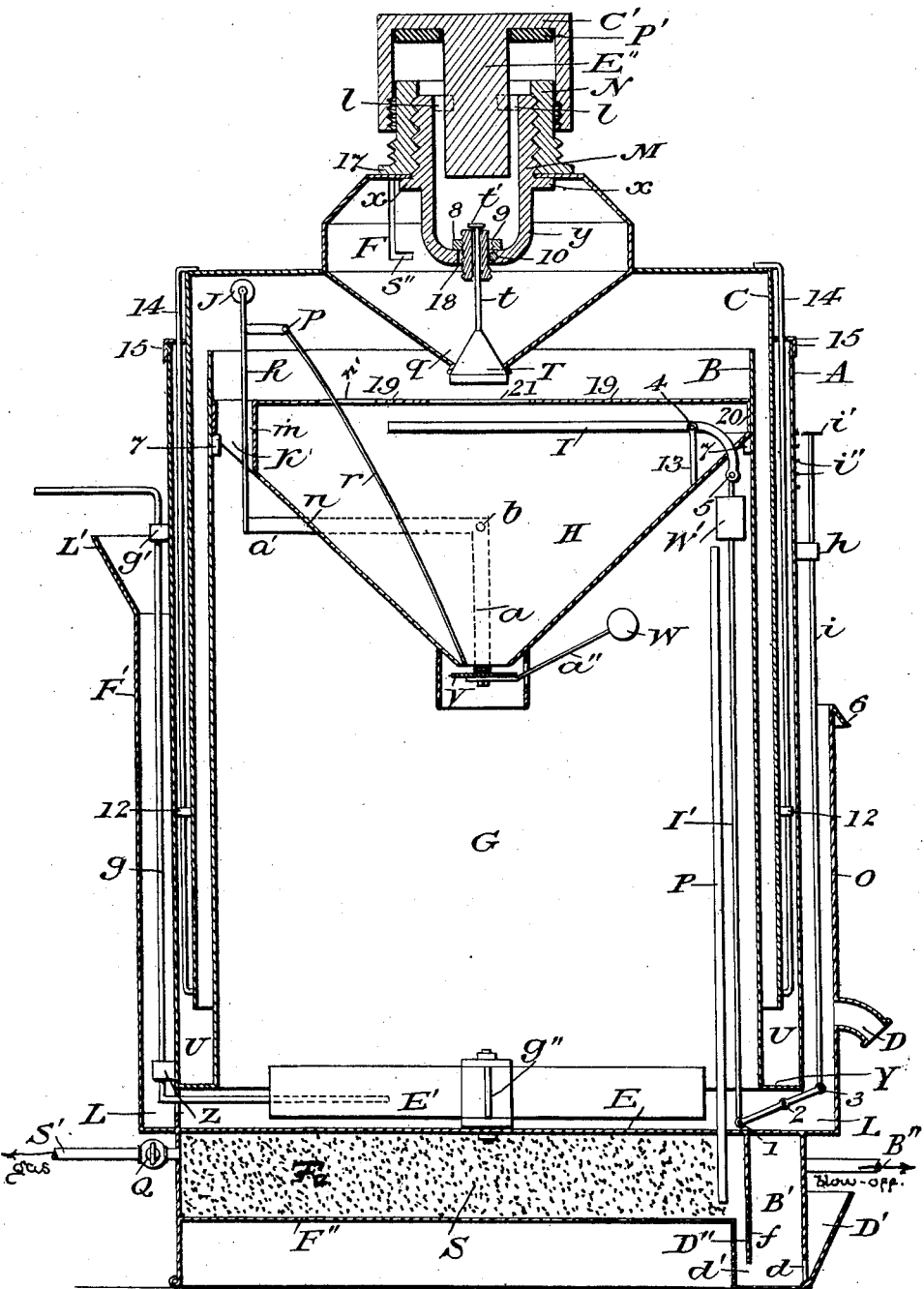

EDMUND R. ANGELL, OF DERRY, NEW HAMPSHIRE.

ACETYLENE-GENERATOR.

No. 833,148.          Specification of Letters Patent.          Patented Oct. 16, 1906.

Application filed February 21, 1903. Serial No. 142,983.

*To all whom it may concern:*

Be it known that I, EDMUND R. ANGELL, a citizen of the United States, residing at Derry, in the county of Rockingham and State of New Hampshire, have invented a new and Improved Acetylene-Generator, of which the following is a specification.

This acetylene-generator belongs to that class in which the carbid is fed automatically in small portions at a time into a large volume of water.

The objects of my invention are, first, to construct a compact and efficient generator for intermittent or continuous operation, possessing great lighting capacity in small space, automatic in its action, and equally adapted for lighting a cottage or a city; second, to provide a valve for feeding the carbid into the water, easily operated even under a very large charge of carbid, and reliable and positive in its action; third, to provide a charge-chamber for introducing carbid into the apparatus without opening communication between the generator and external air; fourth, to provide means for automatically or otherwise removing the residuum and renewing the water in the generator, periodically or continuously and in such manner that the seal between the generator and atmosphere is never broken and air never admitted to the generator; fifth, to provide means for learning the approximate amount of carbid in the apparatus and when recharging is necessary; sixth, to provide means for automatically removing the condensable vapors and for purifying and cooling the gas. I accomplish these results by means illustrated in the accompanying drawing, which is an elevation of the device, mostly in section.

A is a hollow cylinder and forms the outer casing of the apparatus. B is also a hollow cylinder, smaller in diameter and shorter than A. They are placed concentrically with their tops in the same plane and are attached together by the circular ring Y in the base-plane of B, forming an annular space between them. This annular space contains water, within which the gas-holder C floats.

E is a disk fastened to the casing A on all sides a short distance below the circular ring Y and forms the bottom of the generating-chamber G.

L L are holes through the casing A between the bottom E and the circular ring Y. One of these holes connects with the vertical tube O, which is attached to the side of the casing A. This tube serves as an overflow and is provided with a receding lip 6 to prevent the liquid from the generating-chamber G flowing down the side of the apparatus. This tube is also provided with a draw-off valve attached to the spout D, but not illustrated, placed sufficiently high to prevent the breaking of the seal between the generating-chamber G and the overflow-tube O when a portion of the contents of G are removed through it. This feature is especially important because it prevents access of air when the generator is recharged with water. The second hole L connects with the vertical tube F', also attached to the casing A. This tube is somewhat taller than O, is provided with a large lip L', and conveys the water used in recharging into the generating-chamber. Within this tube and extending its entire length the agitator-rod G, which works the agitator E', is placed. At the top this rod is bent at right angles outwardly to form a handle by which it is turned back and forth in a short horizontal arc. At the bottom it is bent at right angles inwardly to form an arm extending through the hole L and between the radial blades of the agitator and coming in contact alternately with the blades between which it is placed causes the motion of the agitator to stir up the sediment in the generator. The agitator-rod *g* is supported by the strap *g'* near its top and by a second strap *z* near the bottom, both riveted to the casing A.

The agitator E' consists of a number of arms or blades extending radially from its center and is supported by the vertical axis *g''*, fastened in the bottom E of the generating-chamber.

S is the condensing, cooling, and purifying chamber. It is contained between the bottom of the generator and the lower wall F'' of the apparatus and is filled with scrap-iron. The gas from the generator is conducted into it through the pipe P and after traversing the chamber passes to the service-pipe on the opposite side through the pipe S', which contains the stop-cock 2.

D'' is a pocket in the bottom of the purifying-chamber for receiving the condensation.

B' is the blow-off chamber. It is separated from the purifier S and the upper portion of the pocket D'' by the partition *f*, but communicates with D″ by the opening d′ at the bottom of the partition At the bottom of B′ and outwardly from d′ is the opening d, which connects the combination of D″ and B′ with the overflow-lip D′. This lip is sufficiently high to preserve the water seal between it and the purifying-chamber under the normal gas-pressure of the machine and at the same time to allow the escape of any excess of condensed moisture. If at any time the gas-pressure in the apparatus should become excessive, the small quantity of water in D″ is depressed, causing an equal volume to overflow from the lip D′ until some of the gas passes under the partition f and escapes through the blow-off pipe B″. When the pressure is relieved, a portion of the relatively large volume in B′ passes into D″ and rising above the opening d′ reëstablishes the seal between the blow-off and pocket D″.

14 14 are guide-rods fixed to opposite sides of the gas-holder C, and 15′ 15′ are guides fastened to the top of the hollow cylinder A and provided with fingers between which the rods 14 14 move vertically.

12 12 are stops attached to the guide-rods at such distance from the bottom of the gas-holder as to preserve its seal unbroken when the stops come in contact with the fingers of the guides and the increased pressure is relieved by the blow-off.

H is the carbid chamber or hopper. It is shaped like the frustum of a cone inverted and is supported by its broad end resting upon lugs 7 7, fixed upon the inside of the hollow cylinder B, near its top. Directly below the small end of the frustum or mouth of the hopper, separated by a small intervening space, a disk V is suspended, rigidly attached to the central portion of a U-shaped strap a. One arm of this U-shaped strap at its upper extremity is supported by a pivot b, fixed in the outer surface of the frustum, and the other is pivoted to the surface in like manner at a point directly opposite.

a′ represents a circular strap with its nearer end attached to the top of the arm a of the U-shaped strap and at right angles to it. This circular strap a′ passes around the frustum and is attached at its other extremity in like manner to the farther arm of the U-shaped strap.

W is a weight fastened to the disk V by the oblique arm a″. This weight holds the center of the disk in the axis of the frustum and is prevented from carrying it beyond by contact of the circular strap a′ with the external surface of the hopper.

The vertical rod R is rigidly attached to the circular strap a′ and is provided at its top with a friction-wheel J. A partition m, extending from the wall of the hopper up to its cover 19, prevents the carbid in the hopper from falling through the broad hole through which the rod R moves freely. The arm n is rigidly attached to the rod R near the top. The stirring-rod r is pivoted loosely to this arm at p and passing through the hole n′ in the cover 19 extends to the mouth of the hopper in such manner that when the rod R is depressed by the descent of the gas-holder it is thrust through the mouth of the hopper, thus loosening the carbid so it will feed down gradually from the hopper when the valve is open, and thus clogging is prevented. When the gas-holder presses upon the wheel J to depress the rod R, motion is also communicated to the bent lever a′ a, pivoted at b, and the disk V is carried from the position it held to close the hopper, thus permitting and causing carbid to fall into the generator, both the disk V and stirring-rod r moving simultaneously and the effect of both beginning on the same side of the mouth of the hopper. When in consequence of the liberation of sufficient gas the gas-holder ceases to press upon the wheel J, the weight W reverses the movement of the disk V, closing the hopper, and at the same time draws the stirring-rod r upward.

19 is the cover of the hopper and is provided with the rim or flange 20 20 to shut within the hollow cylinder B. It has a broad opening 21 in the center, through which the carbid falls into the hopper when it is recharged, a hole n′ through which the stirring-rod r passes, and a hole k in its edge through which the rod R works. The object of this cover or diaphragm is to hinder the access of watery vapor to decompose the carbid.

T′ is a short vertical tube attached to the hopper, extending below the disk V and inclosing it. A slot t″ extends half across the tube in order to receive the disk and the strap supporting it. The object of this tube is to prevent the moisture condensed on the outside of the hopper from running down upon the valve.

I is a lever pivoted at 4 to a support 13, attached to the hopper. Its short arm is bent downward for convenient connection with the rod I′, which at 1 connects with the lever I″, moving upon the pivot 2. This lever I″ at 3 connects with the rod i, moving in the guide k and carrying a pointer i′ before the scale i″. The rod I′ carries the weight W′. This weight holds up the long arm of the lever I so it does not become buried with carbid when the apparatus is recharged. It also holds the pointer i′ at the top of the scale i″. To ascertain approximately how much carbid the hopper contains at any time, the rod i is depressed by the hand and the position of the pointer noted when the long arm of the lever I touches the carbid.

F is the charge-chamber. Its connections are represented larger than proportional for the sake of showing them in detail.

N is a tall thimble or nipple fastened to the top of the charge-chamber by the shoulder 17. A fine screw-thread is cut upon the lower part of the outside of this nipple next to the shoulder, but its upper surface is turned smooth, removing the thread of the screw. A screw with coarse thread is cut upon the inside of this nipple its entire length.

M is a bushing threaded to screw into the nipple N as a bolt screws into a nut. This threaded bushing is provided with the shoulder $x$ to prevent its screwing up into the nipple farther than necessary to draw the conical stopper T tightly into the hole $q$ in the bottom of the chamber F.

S'' is a stop to prevent the threaded bushing M being completely unscrewed from the nipple N.

The yoke $y$, rigidly attached to the bushing M, and the rod $t$, similarly fastened to the stopper T, but connected to each other by a swivel-joint, effect connection between bushing and stopper. This connection is properly adjusted and any compression of the stopper compensated by means of the nut 8 upon the threaded bushing 9, movable vertically in the hole 18 in the yoke $y$, but prevented from rotating therein by the pin 10 passing tangentially through the edge of the hole 18, one side of the bushing being ground flat to slide upon the pin. The bushing rotates about the rod $t$ in the manner of a swivel, supporting this rod by the collar $t'$.

C' is a deep cap. Its lower part is threaded internally to fit the external thread of the nipple N, but the deeper portion of the cap is turned smooth to fit the smooth portion of the nipple, upon which it telescopes or slides like a sleeve. This construction both insures the engagement of the screw upon first contact and prevents gas escaping during the short interval both the packing-ring P' and the stopper T are unseated while the cap is being screwed on or off.

E'' is a blade rigidly attached to the top of the cap and inserted within the bushing M when the cap is applied. The edges of this blade press against the lugs $l\ l$, fastened to the inner surface of the bushing to turn it when the cap is screwed on or off, the lugs sliding vertically on the blade as the motion requires. When the cap is screwed off, the stopper T closes the hole $q$, so that no gas can escape from the gas-holder when the cap is drawn from the nipple, or while the carbid is being introduced into the charge-chamber. While the cap is screwed down the short distance necessary to seat the packing-ring upon the top of the nipple N, the coarse thread of the bushing M causes the stopper T to open the hole $q$ sufficiently for the charge of carbid to fall freely into the hopper.

Having thus described the separate parts of my device in detail, so that one skilled in the art could make them, it remains to describe the use and importance of their combination as a whole, so he could use them. After the proper pipe connections are made with the blow-off B'' and the service-pipe S' sufficient water is poured into the drip D'. The annular space which forms the gas-holder seal is filled with water and water is poured into the generating-chamber through the filling-pipe F' until it appears within a few inches of the lip 6 on the overflow-pipe O. The charge-chamber is filled with carbid and the cap C' is screwed on. The first grains of carbid which fall from the charge-chamber pass through the hopper directly into the generator; but as soon as the gas-holder rises from the wheel J, owing to the evolution of gas, the disk V is brought under the mouth of the hopper by the weight W, and the carbid piling up on it prevents more from falling into the generator until the disk is moved from its position. The reason why the disk V is suspended a little below the mouth of the hopper is to prevent the carbid which rests upon it from becoming wedged between it and the edge of the hopper, thus interfering with its free movement. In order to remove the air which filled the body of the apparatus, a stop-cock in the service-pipe is opened and the machine allowed to operate until the evolution of gas expels the air. This stop-cock may form a by-pass into the blow-off pipe, so as to prevent the gas from entering the building. This operation is necessary only when the machine is first started. The indicator informs the operator when recharging is necessary. Since the diminished gas-pressure which attends the consumption of the last portion of gas from the holder is liable to cause the clogging of the burners from lack of draft, it is important to learn from the indicator when recharging is necessary, so not only to prevent this annoyance, but to insure the continuation of the lights. In recharging the charge of carbid is first introduced by means of the charge-chamber, which prevents admission of air and never allows communication to exist between the inside and outside of the generator. Then the sediment is thoroughly stirred by means of the agitator, the draw-off D opened, and the residuum allowed to flow out. As the contents flow out the gas-holder settles and feeds some carbid into the generator, so enough gas is liberated to occupy the space of the residuum removed. This feature of the apparatus is very important, for it obviates the necessity of admitting air to the generator for the removal of its contents. Finally, the proper quantity of water is introduced. The admission of air not only diminishes the value of the light, but causes the presence of an explosive mixture within the machine every time it is recharged, and so makes accidents possible.

Having thus fully described my invention,

I claim as new, and desire to secure by Letters Patent, the following:

1. In acetylene apparatus, mechanisms for feeding carbid into water, consisting of a hopper, a disk suspended by a U-shaped strap pivoted to opposite sides of the hopper, and adjusted to swing a short distance below its mouth, a weight rigidly attached to said disk by an arm extending obliquely upward, a lever rigidly attached at right angles to said U-shaped strap on the side opposite to said weight, its outermost point carrying an upright post provided with a friction-wheel at its top, in combination with a generator and floating gas-holder.

2. In acetylene apparatus, mechanism for feeding carbid into water consisting of a hopper, a disk suspended by a U-shaped strap pivoted to opposite sides of the hopper and adjusted to swing a short distance below its mouth, a weight rigidly attached to said disk by an arm extending obliquely upward, a lever rigidly attached at right angles to the said U-shaped strap on the side opposite to said weight, its outermost point carrying an upright post provided with a friction-wheel at its top, an arm fixed rigidly at right angles to said post near its top and having a rod loosely pivoted to its inner extremity, said rod extending downwardly within the hopper to its mouth, in combination with a generator and floating gas-holder.

3. A charge-chamber having two gates, one consisting of a hole provided with a packing-ring and closed by a conical stopper; the other consisting of a nipple having a coarse screw-thread its entire length inside, a fine thread on its lower external surface, but its upper external surface turned smooth; a threaded bushing adapted to fit the inside of said nipple and provided with a yoke in the central lower portion of which is an adjustable swivel with eared nut and rod whereby said conical stopper is attached to said threaded bushing, and a cap adapted to screw on said nipple, having a broad blade extending downwardly from its top inside adapted to engage lugs within the threaded bushing whereby motion is imparted to said threaded bushing by the screwing on or off of said cap to open or close the gate provided with said conical stopper, in combination with a generator, a carbid-hopper, carbid-feed mechanism and floating gas-holder.

EDMUND R. ANGELL.

Witnesses:
G. K. BARTLETT,
C. E. BRYANT.